United States Patent
Agarwal et al.

(10) Patent No.: US 9,834,722 B2
(45) Date of Patent: Dec. 5, 2017

(54) DELAYED CROSSLINKING COMPOSITION OR REACTION PRODUCT THEREOF FOR TREATMENT OF A SUBTERRANEAN FORMATION

(71) Applicant: Halliburton Energy Services, Inc., Houston, TX (US)

(72) Inventors: Shashank Deep Agarwal, Sambhal (IN); Amit Chandrakant Agrawal, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 160 days.

(21) Appl. No.: 14/606,684

(22) Filed: Jan. 27, 2015

(65) Prior Publication Data
US 2016/0215602 A1 Jul. 28, 2016

(51) Int. Cl.
| | |
|---|---|
| C09K 8/90 | (2006.01) |
| C09K 8/68 | (2006.01) |
| E21B 43/26 | (2006.01) |
| C09K 8/88 | (2006.01) |

(52) U.S. Cl.
CPC .............. *C09K 8/905* (2013.01); *C09K 8/685* (2013.01); *C09K 8/887* (2013.01)

(58) Field of Classification Search
CPC . C09K 8/90; C09K 8/905; C09K 8/68; C09K 8/685; C09K 8/88; C09K 8/887; E21B 43/04; E21B 43/26; E21B 43/267
See application file for complete search history.

(56) References Cited

U.S. PATENT DOCUMENTS

| | | | | |
|---|---|---|---|---|
| 2006/0003900 A1* | 1/2006 | Hanes, Jr. | .............. | C09K 8/685 507/203 |
| 2012/0004148 A1* | 1/2012 | Ogle | ........................ | C09K 8/12 507/213 |
| 2013/0220621 A1* | 8/2013 | Legemah | ................ | C07F 5/025 166/308.5 |
| 2013/0312970 A1* | 11/2013 | Lafitte | .................... | A61K 8/022 166/305.1 |
| 2015/0075789 A1* | 3/2015 | Singh | ..................... | C09K 8/685 166/278 |
| 2016/0257877 A1* | 9/2016 | Russell | .................... | C09K 8/68 |

\* cited by examiner

*Primary Examiner* — Zakiya W Bates
*Assistant Examiner* — Crystal J Miller
(74) *Attorney, Agent, or Firm* — Chamberlain Hrdlicka

(57) ABSTRACT

Various embodiments disclosed relate to delayed crosslinking compositions or reaction products thereof for treatment of a subterranean formation. In various embodiments, the present invention provides a method of treating a subterranean formation including placing in a subterranean formation a subterranean treatment composition including at least one of a delayed crosslinking composition and a reaction product thereof. The delayed crosslinking composition includes a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition also includes a glycol including at least one of a 1,2-diol and a 1,3-diol.

13 Claims, 2 Drawing Sheets

DELAYED CROSSLINKING COMPOSITION OR REACTION PRODUCT THEREOF FOR TREATMENT OF A SUBTERRANEAN FORMATION

BACKGROUND

During the drilling, completion, and production phases of wells for petroleum, the downhole use of compositions having higher viscosities is important for a wide variety of purposes. Such fluids can more effectively carry materials (e.g., proppants, gravel, and the like) to a desired location downhole. Similarly, such fluids can more effectively carry materials away from a drilling location downhole. Further, the use of such fluids during hydraulic fracturing generally results in larger, more dominant fractures. However, during pumping downhole, high viscosity liquids can generate high friction pressure, which can make pumping less efficient.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
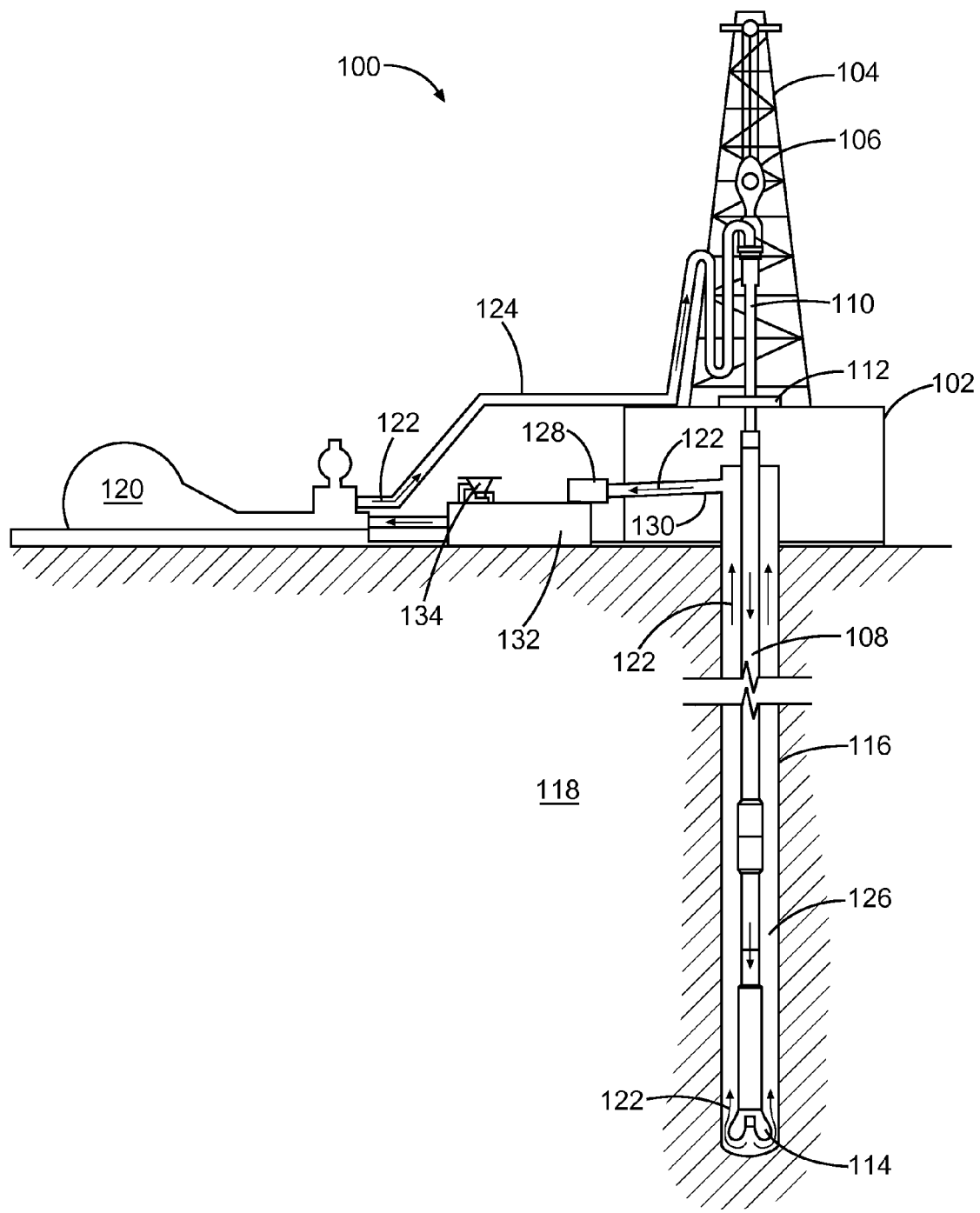
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000.1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R), SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R), SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$) hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in a subterranean formation a subterranean treatment composition. The subterranean treatment composition includes at least one of a delayed crosslinking composition and a reaction product thereof. The delayed crosslinking composition includes a crosslinker including a functionality chosen from —B(OH)$_2$, —B$^-$(OH)$_2$, —O—B(OH)—O—, —O—B(OH)—O—B$^-$(OH)(—O—)$_2$, a salt thereof, an ester thereof, and a combination thereof. The delayed crosslinking composition also includes a glycol including at least one of a 1,2-diol and a 1,3-diol.

In various embodiments, the present invention provides a method of treating a subterranean formation. The method includes placing in a subterranean formation an aqueous subterranean treatment composition. The subterranean treatment composition includes about 0.01 wt % to about 50 wt % of a viscosifier crosslinkable via at least one of boric acid, tetrahydroxyborate, a salt thereof, and an ester thereof. The subterranean treatment composition includes at least one of a delayed crosslinking composition and a reaction product thereof. The delayed crosslinking composition or product thereof is about 0.01 wt % to about 50 wt % of the subterranean treatment composition. The delayed crosslinking composition includes about 0.01 wt % to about 50 wt % of a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The subterranean treatment composition also includes about 0.01 wt % to about 50 wt % of glycerin.

In various embodiments, the present invention provides a system including a subterranean treatment composition including at least one of a delayed crosslinking composition and a reaction product thereof. The delayed crosslinking composition includes a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition also includes a glycol including at least one of a 1,2-diol and a 1,3-diol. The system also includes a subterranean formation including the composition therein.

In various embodiments, the present invention provides a system including a tubular disposed in a subterranean formation. The system also includes a pump configured to pump a subterranean treatment composition through the tubular. The subterranean treatment composition includes at least one of a delayed crosslinking composition and a reaction product thereof. The delayed crosslinking composition includes a crosslinker including a functionality chosen from —B(OH)$_2$, —B$^-$(OH)$_2$, a salt thereof, an ester thereof, and a combination thereof. The delayed crosslinking composition also includes a glycol including at least one of a 1,2-diol and a 1,3-diol.

In various embodiments, the present invention provides a subterranean treatment composition for treatment of a subterranean formation. The subterranean treatment composition includes at least one of a delayed crosslinking composition and a reaction product thereof. The delayed crosslinking composition includes a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition also includes a glycol including at least one of a 1,2-diol and a 1,3-diol.

In various embodiments, the present invention provides an aqueous subterranean treatment composition for treatment of a subterranean formation. The subterranean treatment composition includes about 0.01 wt % to about 50 wt % of a viscosifier crosslinkable via at least one of boric acid, tetrahydroxyborate, a salt thereof, and an ester thereof. The subterranean treatment composition also includes at least one of a delayed crosslinking composition and a reaction product thereof. The delayed crosslinking composition or product thereof is about 0.01 wt % to about 50 wt % of the subterranean treatment composition. The delayed crosslinking composition includes about 0.01 wt % to about 50 wt % of a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition also includes about 0.01 wt % to about 50 wt % of glycerin.

In various embodiments, the present invention provides a method of preparing a composition for treatment of a subterranean formation. The method includes forming a subterranean treatment composition including at least one of a delayed crosslinking composition and a reaction product thereof. The delayed crosslinking composition includes a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition also includes a glycol including at least one of a 1,2-diol and a 1,3-diol.

In various embodiments, the delayed crosslinking composition or reaction product thereof and treatment composition including the same can have certain advantages over other compositions for delayed crosslinking, at least some of which are unexpected.

In some embodiments, the delayed crosslinking composition or reaction product thereof is less expensive than other delayed crosslinking compositions, such as less expensive per unit mass. In some embodiments, the delayed crosslinking composition or reaction product thereof provides a greater amount of crosslinking per unit mass for a given amount of crosslinkable viscosifier than other crosslinkers. In various embodiments, the time and temperature that triggers the delayed crosslinking composition or reaction product thereof to provide crosslinking can be more easily configured and controlled than other crosslinking compositions.

In some embodiments, the delayed crosslinking composition or reaction product thereof provides better delayed crosslinking in fluids having high temperatures than other crosslinking compositions. For example, in some embodiments, in treatment fluids that are preheated prior to being placed downhole, such as for stimulation for heavy oil recovery, the delayed crosslinking composition or reaction product thereof can avoid or reduce crosslinking at the surface and during transport to subterranean stimulation location, as compared to other crosslinking compositions.

Method of Treating a Subterranean Formation.

In some embodiments, the present invention provides a method of treating a subterranean formation. The method can include placing a subterranean treatment composition in a subterranean formation. The subterranean treatment composition can include at least one of a delayed crosslinking composition and a reaction product thereof. The delayed crosslinking composition includes a boron-containing crosslinker and a glycol that includes at least one of a 1,2-diol and a 1,3-diol. In some embodiments, the method can be a method of hydraulic fracturing, drilling, stimulation, fracturing, spotting, clean-up, completion, remedial treatment, applying a pill, acidizing, cementing, packing, spotting, or a combination thereof.

The placing of the subterranean treatment composition in the subterranean formation can include contacting the subterranean treatment composition and any suitable part of the subterranean formation, or contacting the subterranean treatment composition and a subterranean material, such as any suitable subterranean material. The subterranean formation can be any suitable subterranean formation. In some examples, the placing of the subterranean treatment composition in the subterranean formation includes contacting the subterranean treatment composition with or placing the subterranean treatment composition in at least one of a fracture, at least a part of an area surrounding a fracture, a flow pathway, an area surrounding a flow pathway, and an area desired to be fractured. The placing of the subterranean treatment composition in the subterranean formation can be any suitable placing and can include any suitable contacting between the subterranean formation and the subterranean treatment composition.

In some embodiments, the method includes obtaining or providing the subterranean treatment composition. Obtaining or providing the subterranean treatment composition can include combining one or more components of the subterranean treatment composition (e.g., combining a viscosifier with the delayed crosslinking composition or a reaction product there), allowing one or more components to react (e.g., allowing components of the delayed crosslinking composition to react to form a reaction product thereof), or a combination thereof, to form the subterranean treatment composition. The obtaining or providing of the subterranean treatment composition can occur at any suitable time and at any suitable location. The obtaining or providing of the subterranean treatment composition can occur above the surface. The obtaining or providing of the subterranean treatment composition can occur in the subterranean formation (e.g., downhole). In some embodiments, some aspects of the obtaining or providing can occur above-surface (e.g., allowing a delayed crosslinking composition to react to form a reaction product thereof) while other aspects of the obtaining or providing occur in the subterranean formation (e.g., combining the reaction product of the delayed crosslinking composition with a viscosifier).

The method can include hydraulic fracturing, such as a method of hydraulic fracturing to generate a fracture or flow pathway. The placing of the subterranean treatment composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the subterranean treatment composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the subterranean treatment composition is placed in or contacted to, or the subterranean treatment composition is placed in or contacted to an area surrounding the generated fracture or flow pathway.

In some embodiments, the subterranean treatment composition is preheated prior to placing the subterranean treatment composition in the subterranean formation, such that the subterranean treatment composition has a preheat temperature at the time of being placed into the subterranean formation. In some embodiments, the method includes performing the preheating; in other embodiments, the preheating is performed prior to beginning the method. The subterranean treatment composition can be preheated to any suitable temperature prior to being placed into the subterranean formation, for example, about 40° C. to about 200° C., about 50° C. to 100° C., about 40° C. or less, or about 45° C., 50, 55, 60, 65, 70, 75, 80, 85, 90, 95, 100, 105, 110, 120, 130, 140, 150, 160, 170, 180, 190, or about 200° C. or more.

The subterranean treatment composition, or a component thereof (e.g., the delayed crosslinking composition, a reaction product thereof, or a mixture including any one or more of the same) can include one or more carrier fluids. The one or more carrier fluids can form any suitable proportion of the subterranean treatment composition or the component thereof, such as about 0.01 wt % to about 99 wt %, or about 0.01 wt % to about 50 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

In some embodiments, the carrier fluid is water. The water can be any suitable water, such as water, brine, produced water, flowback water, brackish water, and sea water. The water can include a salt (e.g., brine) that can be any suitable one or more salts, such as at least one of NaBr, $CaCl_2$, $CaBr_2$, $ZnBr_2$, KCl, NaCl, a carbonate salt, a sulfonate salt, a phosphonate salt, a magnesium salt, a bromide salt, a formate salt, an acetate salt, and a nitrate salt. The water can have any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The water can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the water can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more. The aqueous carrier fluid can include one or more water-miscible liquids, such as methanol, ethanol, ethylene glycol, propylene glycol, glycerol, and the like.

Viscosifier.

In some embodiments, the subterranean treatment composition includes one or more viscosifiers. In other embodiments, the subterranean treatment composition is free of viscosifier, and the subterranean treatment composition can combine with one or more viscosifiers downhole. In some embodiments, the method can include crosslinking the viscosifier, such as by allowing a combination of adequate time and temperature such that the viscosifier is crosslinked by the delayed crosslinking composition or a reaction product thereof. In some embodiments, crosslinking the viscosifier can include hydrolyzing the reaction product of the delayed crosslinking composition such that B—OH groups are formed, which can then go on to crosslink the viscosifier.

The viscosifier is crosslinkable via at least one of boric acid, tetrahydroxyborate, a salt thereof, and an ester thereof (e.g., the viscosifier is crosslinkable via the boron-containing crosslinker, or the hydrolysis product of the reaction product of the delayed crosslinking composition, or both). Any suitable proportion of the subterranean treatment composition can be the one or more viscosifiers, such as about 0.01 wt % to about 99.99 wt % of the subterranean treatment composition, about 0.01 wt % to about 50 wt %, or about 0.01 wt % or less, about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

The viscosifier can be at least one of poly(vinyl alcohol), a substituted or unsubstituted poly($C_1$-$C_{20}$)alkenoic acid, a polysaccharide, a substituted or unsubstituted ($C_1$-$C_{20}$)hydrocarbyl ester thereof, a salt thereof, and a copolymer thereof. The viscosifier can be at least one of poly(vinyl alcohol), a substituted or unsubstituted poly($C_1$-$C_{20}$)alkenoic acid, polyhydroxypropyl acrylic acid, acrylamide, polyfumaric acid, polymethacrylic acid, polyhydroxypropyl acrylic acid, poly(vinyl phosphonic acid), poly(vinylidene diphosphonic acid), polyitaconic acid, polycrotonic acid, poly(mesoconic acid), poly(polycitraconic acid), poly(styrene sulfonic acid), poly(allyl sulfonic acid), poly(methallyl sulfonic acid), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum, gum ghatti, gum arabic, locust bean gum, cellulose, and derivatized cellulose. The viscosifier can be guar gum or a guar gum derivative. The viscosifier can be at least one of guar and hydroxypropyl guar.

Delayed Crosslinking Composition and Reaction Product Thereof.

The subterranean treatment composition includes a delayed crosslinking composition, a reaction product of the delayed crosslinking composition, or a combination thereof. The delayed crosslinking composition can include a boron-containing crosslinker that includes a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition can include a glycol including at least one of a 1,2-diol and a 1,3-diol. The reaction product of the delayed crosslinking composition can include a reaction product of the glycol and the boron-containing crosslinker that provides delayed crosslinking as compared to the boron-containing crosslinker alone, with any suitable percent conversion of the glycol and the boron-containing crosslinker, such that the method can be performed as described herein.

Any suitable amount of the subterranean treatment composition can be the delayed crosslinking composition, a reaction product thereof, or a combination thereof, such as about 0.01 wt % to about 100 wt %, about 0.01 wt % to about 50 wt %, or about 0.01 wt % or less, about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, about 99.99 wt % or more, or about 100 wt % (e.g., the subterranean treatment composition can be the delayed crosslinking composition, a reaction product thereof, or a combination thereof).

In various embodiments, the delayed crosslinking composition including the glycol and the boron-containing crosslinker can experience a delay in crosslinking that is any suitable amount greater than the crosslinking time of a corresponding composition that does not include the glycol, such as about 1 times greater to about 1,000 times greater, or about 5 times greater to about 100 times greater, or about 1 times greater or less, or about 2 times greater, 3, 4, 5, 6, 7, 8, 9, 10, 12, 14, 16, 18, 20, 22, 24, 26, 28, 30, 32, 34, 36, 38, 40, 45, 50, 55, 60, 65, 70, 75, 80, 85, 90, 95, 100, 110, 120, 130, 140, 150, 175, 200, 225, 250, 275, 300, 350, 400, 450, 500, 750, or about 1,000 greater or more. Crosslinking time can be defined in any suitable way, such as the time required for a particular viscosity to be reached.

Boron-Containing Crosslinker.

The delayed crosslinking composition includes a crosslinker. The crosslinker is a boron-containing crosslinker that includes a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition can include one boron-containing crosslinker, or more than one boron-containing crosslinker. The delayed crosslinking composition can include any suitable amount of the one or more boron-containing crosslinkers. For example, 0.01 wt % to about 99.99 wt % of the delayed crosslinking composition can be the one or more boron-containing crosslinkers, or about 0.01 wt % to about 50 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

The boron-containing crosslinker can react with —OH groups on the crosslinkable viscosifier to provide a crosslinked viscosifier that provides increased viscosity. The boron-containing crosslinker can react with —OH groups of the 1,2-diol or 1,3-diol to provide a B—O-glycol (wherein the glycol bound the B—O— has an H of one of the —OH groups that was part of the 1,2-diol or 1,3-diol replaced by a bond to the oxygen atom of the B—O—) which can hydrolyze to form B—OH functionalities which can crosslink the viscosifier or which can react directly with the viscosifier to crosslink the viscosifier. The reaction of the boron-containing crosslinker with the glycol provides delayed crosslinking of the viscosifier, as compared to the crosslinking that would occur in a corresponding composition including the boron-containing crosslinker, the viscosifier, but not including the glycol.

The crosslinker can have at least one of the structures R—B(OH)$_2$, R—B$^-$(OH)$_2$, a substituted or unsubstituted (C$_1$-C$_{20}$)hydrocarbyl ester thereof, and a salt thereof, wherein R is chosen from a substituted or unsubstituted (C$_1$-C$_{50}$)hydrocarbyl, a polymer having a repeating unit including a substituted or unsubstituted (C$_1$-C$_{50}$)hydrocarbyl, —O—B(OR$^1$)$_2$, and —O—B$^-$(OR$^1$)$_3$, wherein at each occurrence R$^1$ is independently selected from —H, —B(OR$^1$)$_2$, and —B$^-$(OR$^1$)$_3$, wherein each B or B$^-$ in R$^1$ and the corresponding groups attached thereto are each independently the same or different as those occurring in R (e.g., the boron-containing crosslinker can include cyclic structures). The crosslinker can have at least one of the structures B(OR$^2$)$_3$, B$^-$(OR$^2$)$_4$, a substituted or unsubstituted (C$_1$-C$_{20}$)hydrocarbyl ester thereof, and a salt thereof, wherein at each occurrence R$^2$ is independently selected from —H, —B(OR$^3$)$_2$, and —B—(OR$^3$)$_4$, wherein each B or B$^-$ in R$^2$ and the corresponding groups attached thereto are each independently the same or different as those in the occurring in the B(OR$^2$)$_3$ and the B$^-$(OR$^2$)$_4$.

In some embodiments, the crosslinker can have one of the following structures, or a salt or a substituted or unsubstituted (C$_1$-C$_{20}$)hydrocarbyl ester thereof:

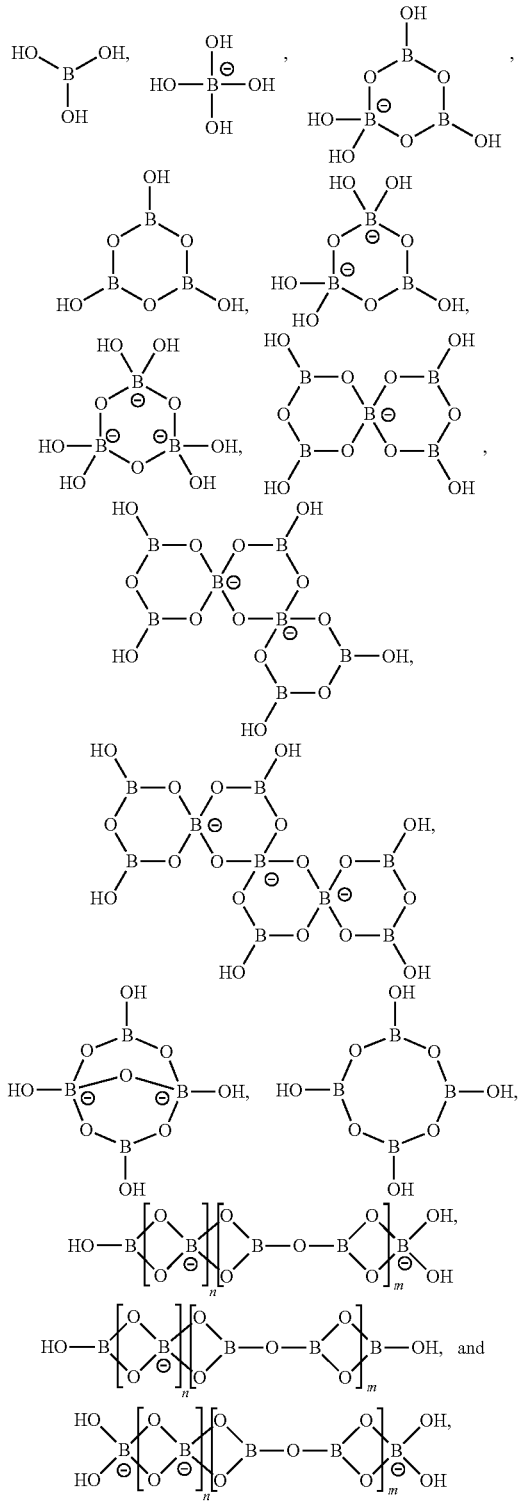

The variables n and m can be each independently about 0 to about 1,000, wherein n+m is at least 1, wherein the repeating groups are in block or random copolymer arrangement.

The reaction product of the boron-containing crosslinker and the 1,2-diol or 1-3 diol can have the following structure, or a salt or a substituted or unsubstituted (C$_1$-C$_{20}$)hydrocarbyl ester thereof:

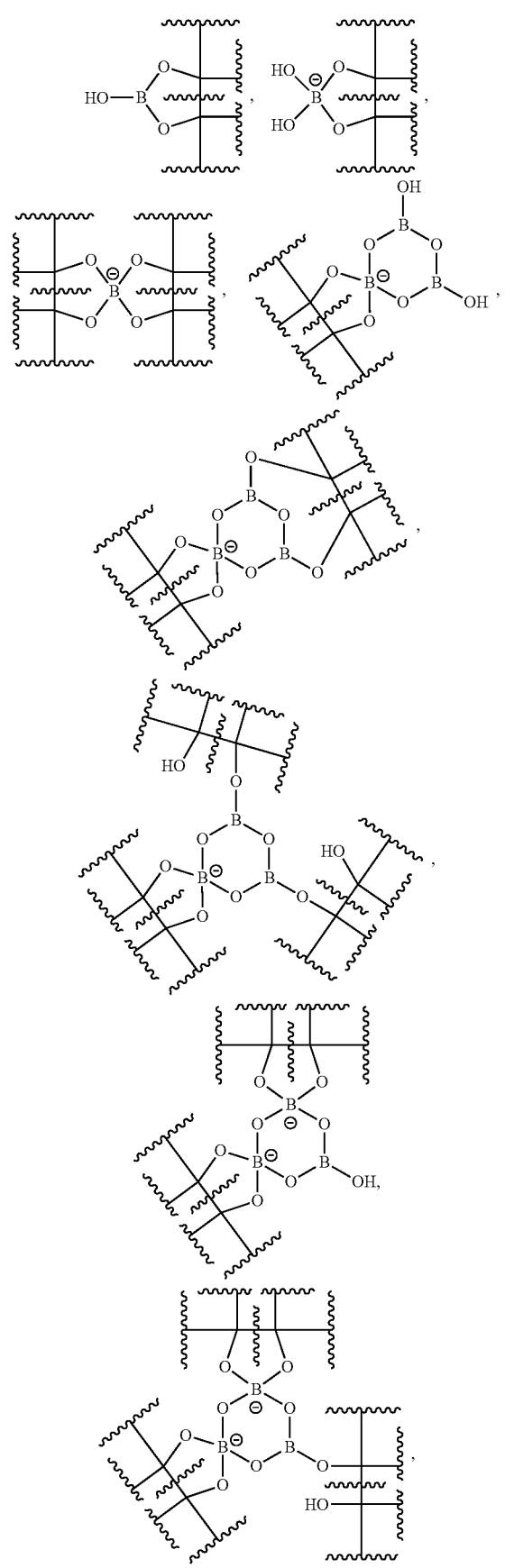
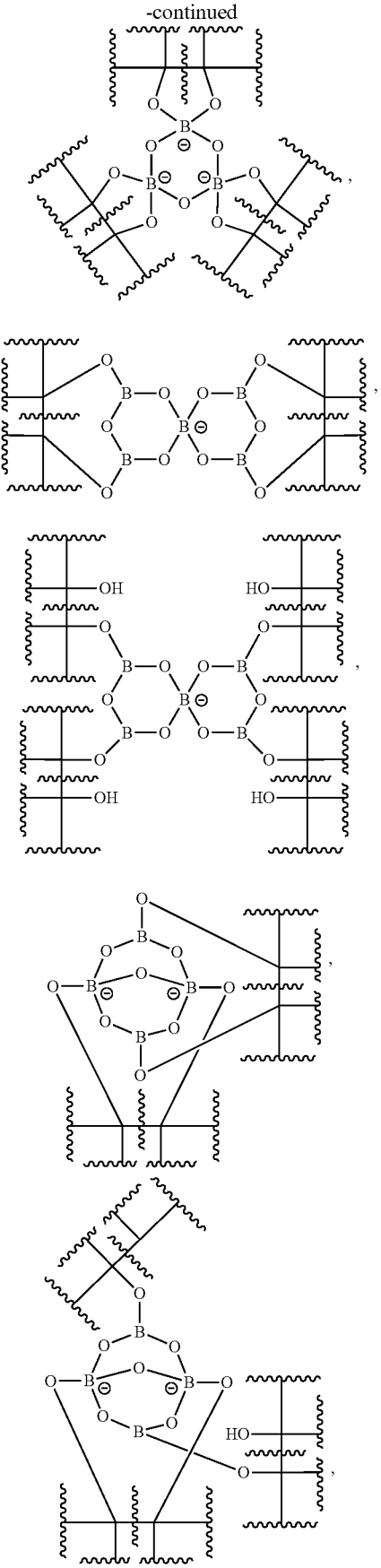

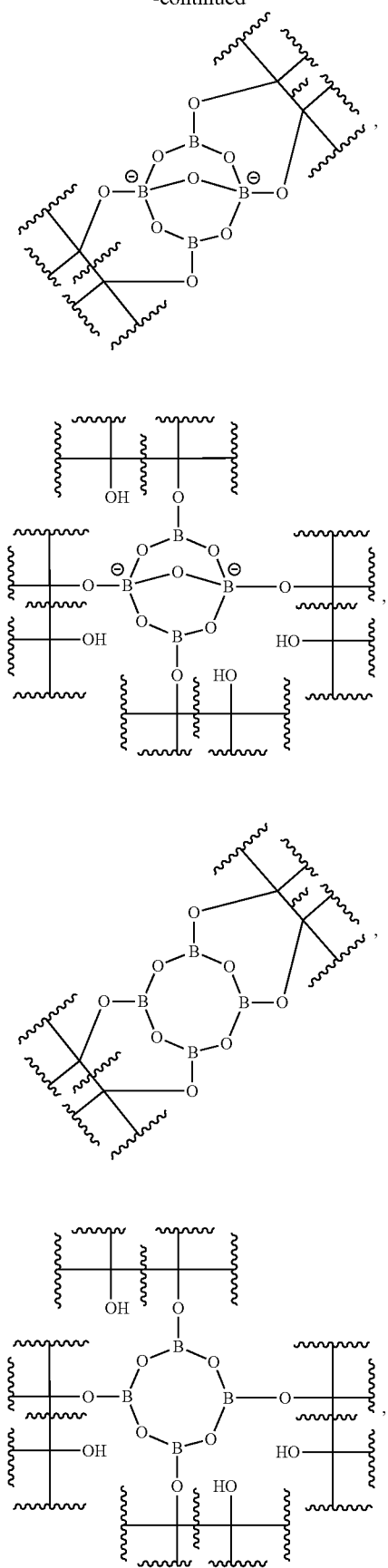

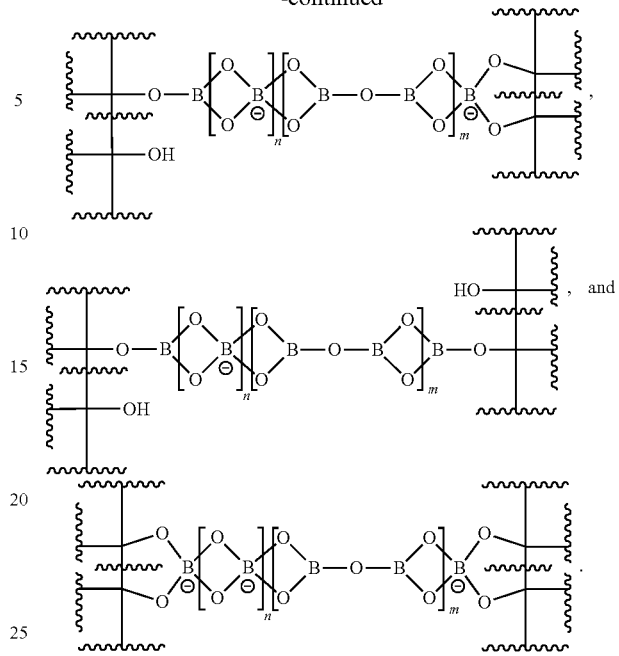

In the example reaction product structures shown herein, the structure

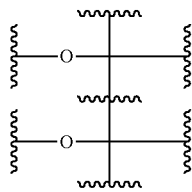

represents the 1,2-diol or the 1,3-diol reacted with the boron-containing crosslinker. The reaction product structures are merely examples and are not intended to be limiting. In any of the example reaction products shown herein, one or more of the B—O-glycol bonds can be B—OH bonds, so long as at least one B—O-glycol bond occurs in the reaction product. Any one or two B—OH groups on the boron-containing crosslinker can be bonded to the glycol via the oxygen atom of the B—OH group; any suitable combination or permutation of bonding between the 1,2-diol and 1,3-diol —OH groups of the glycol and the B—OH groups of the boron-containing crosslinker is encompassed as an embodiment of the reaction product of the delayed crosslinking composition.

In various embodiments, a salt of the boron-containing crosslinker can be a salt of a B$^-$ ion in the crosslinker, a salt of a B—O$^-$ ion in the crosslinker, or a combination thereof. The salt can include any suitable counterion. For example, the counterion can be Na$^+$, K$^+$, Li$^+$, Zn$^+$, NH$_4^+$, Fe$^{2+}$, Fe$^{3+}$, Cu$^{1+}$, Cu$^{2+}$, Ca$^{2+}$, Mg$^{2+}$, Zn$^{2+}$, Al$^{3+}$, or a combination thereof.

Glycol.

The delayed crosslinking composition includes a glycol. The glycol includes at least one of a 1,2-diol and a 1,3-diol functionality. The delayed crosslinking composition includes one glycol or more than one glycol. The delayed crosslinking composition can include any suitable amount of the one or more glycols. For example, about 0.01 wt % to about 99.99 wt % of the delayed crosslinking composition can be the one or more glycols, or about 0.01 wt % to about 50 wt %, or about 0.01 wt % or less, or about 0.1 wt %, 0.2, 0.3, 0.4, 0.5, 0.6, 0.7, 0.8, 0.9, 1, 1.2, 1.4, 1.6, 1.8, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

The 1,2-diol or 1,3-diol functionality of the glycol can react with B—OH functionalities on the crosslinker to provide delayed crosslinking, wherein the B—O-glycol (wherein the glycol bound to the B—O— has an H of one of the —OH groups that was part of the 1,2-diol or 1,3-diol replaced by a bond to the oxygen atom of the B—O—) can hydrolyze to form B—OH functionalities which can crosslink the viscosifier or can react directly with the viscosifier to crosslink the viscosifier. The glycol can be any suitable glycol that can react with the boron-containing crosslinker to provide delayed crosslinking.

The 1,2-diol or 1,3-diol can be a substituted or unsubstituted ($C_1$-$C_{50}$)hydrocarbon glycol or a polymer including a repeating unit that is a substituted or unsubstituted ($C_1$-$C_{50}$) hydrocarbon glycol. The 1,2-diol or 1,3-diol can be a substituted or unsubstituted ($C_1$-$C_{20}$)hydrocarbon glycol. The 1,2-diol or 1,3-diol can be a ($C_1$-$C_{10}$)alkane glycol. The glycol can be 1,2-propylene glycol, 1,3-propylene glycol, 1,2,3-propane triol, 2-methyl-2,4-pentane, 1,2-butanediol, 1,3-butanediol, or 2,3-butanediol. The glycol can be a polyol having more than two hydroxy groups; in some embodiments, one or more hydroxy groups can be in the form of an ester formed from a substituted or unsubstituted ($C_1$-$C_{30}$) hydrocarbon carboxylic acid, so long as the polyol includes a free 1,2-diol or free 1,3-diol for reacting with the boron-containing crosslinker.

The glycol can be a 1,2-diol. The glycol can be glycerin (e.g., 1,2,3-propane triol). The glycol can be an ester of glycerin and a substituted or unsubstituted ($C_1$-$C_{30}$)hydrocarbon carboxylic acid at one hydroxy group of the glycerin.
Other Components.

The delayed crosslinking composition, the reaction product thereof, the subterranean treatment composition including either of the same, or a mixture including the subterranean treatment composition, can include any suitable additional component in any suitable proportion, such that the delayed crosslinking composition, the reaction product thereof, the subterranean treatment composition including either of the same, or a mixture including any one of the same, can be used as described herein.

In some embodiments, the delayed crosslinking composition, the reaction product thereof, the subterranean treatment composition including either of the same, or a mixture including any one of the same, includes one or more secondary viscosifiers. The secondary viscosifier can be any suitable viscosifier. The secondary viscosifier can affect the viscosity of the delayed crosslinking composition, the reaction product thereof, the subterranean treatment composition, or a mixture including any one of the same, at any suitable time and location. In some embodiments, the secondary viscosifier provides an increased viscosity at least one of before injection into the subterranean formation, at the time of injection into the subterranean formation, during travel through a tubular disposed in a borehole, once reaching a particular subterranean location, or some period of time after reaching a particular subterranean location. In some embodiments, the secondary viscosifier can be about 0.000.1 wt % to about 10 wt % of the delayed crosslinking composition, the reaction product thereof, the subterranean treatment composition including either of the same, or a mixture including any one of the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more.

The secondary viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The secondary viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The secondary viscosifier can include a crosslinked gel or a crosslinkable gel. The secondary viscosifier can include at least one of a linear polysaccharide, and a poly(($C_2$-$C_{10}$)alkene), wherein the ($C_2$-$C_{10}$)alkene is substituted or unsubstituted. The secondary viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the secondary viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The secondary viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$) hydrocarbyl having at least one aliphatic unsaturated C—C bond therein, and a substituted or unsubstituted ($C_2$-$C_{50}$) alkene. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$) alkenyl nitrogen containing substituted or unsubstituted ($C_1$-$C_{10}$)heterocycle. The secondary viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The secondary viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The secondary viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the delayed crosslinking composition, the reaction product thereof, the subterranean treatment composition including either of the same, or a mixture including any one of the same, can include one or more secondary crosslinkers. The secondary crosslinker can be any suitable crosslinker. In some examples, the secondary crosslinker can be incorporated in a crosslinked viscosifier, and in other examples, the secondary crosslinker can crosslink a crosslinkable material (e.g., downhole). The secondary crosslinker can include at least one of chromium, aluminum, antimony, zirconium, titanium, calcium, boron, iron, silicon, copper, zinc, magnesium, and an ion thereof. The secondary crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the secondary crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the secondary crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The secondary crosslinker can be about 0.000.01 wt % to about 5 wt % of the delayed crosslinking composition, the reaction product thereof, the subterranean treatment composition including either of the same, or a mixture including any one of the same, about 0.001 wt % to about 0.01 wt %, or about 0.000.01 wt % or less, or about 0.000.05 wt %, 0.000.1, 0.000.5, 0.001, 0.005, 0.01, 0.05, 0.1, 0.5, 1, 2, 3, 4, or about 5 wt % or more.

In some embodiments, the delayed crosslinking composition, the reaction product thereof, the subterranean treatment composition including either of the same, or a mixture including any one of the same, can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the delayed crosslinking composition, the reaction product thereof, the subterranean treatment composition including either of the same, or a mixture including any one of the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The delayed crosslinking composition, the reaction product thereof, the subterranean treatment composition including either of the same, or a mixture including any one of the same, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the delayed crosslinking composition, the reaction product thereof, the subterranean treatment composition including either of the same, or a mixture including any one of the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The delayed crosslinking composition, the reaction product thereof, the subterranean treatment composition including either of the same, or a mixture including any one of the same, can include any suitable downhole fluid. Combination with any suitable downhole fluid can occur before, during, or after the placement of the subterranean treatment composition in the subterranean formation or the contacting of the subterranean treatment composition and the subterranean material. In some examples, combination with a downhole fluid can occur above the surface, and then the combined composition is placed in a subterranean formation or contacted with a subterranean material. In another example, the delayed crosslinking composition, the reaction product thereof, the subterranean treatment composition including either of the same, or a mixture including any one of the same, is injected into a subterranean formation to combine with a downhole fluid, and the combined composition is contacted with a subterranean material or is considered to be placed in the subterranean formation. The placement into the subterranean formation can include contacting the subterranean material and the delayed crosslinking composition, the reaction product thereof, the subterranean treatment composition including either of the same, or a mixture including any one of the same. Any suitable weight percent of the delayed crosslinking composition, the reaction product thereof, the subterranean treatment composition including either of the same, or a mixture including any one of the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %.

In some embodiments, the delayed crosslinking composition, the reaction product thereof, the subterranean treatment composition including either of the same, or a mixture including any one of the same, can include any suitable amount of any suitable material used in a downhole fluid. For example, the delayed crosslinking composition, the reaction product thereof, the subterranean treatment composition including either of the same, or a mixture including any one of the same, can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the delayed crosslinking composition, the reaction product thereof, the subterranean treatment composition including either of the same, or a mixture including any one of the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the delayed crosslinking composition, the reaction product thereof, the subterranean treatment composition including either of the same, or a mixture including any one of the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™ N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO- SQUEEZE®, BAROFIBRE™, STEELSEAL®, and HYDRO-PLUG® lost circulation management materials. Any suitable proportion of the delayed crosslinking composition, the reaction product thereof, the subterranean treatment composition including either of the same, or a mixture including any one of the same can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the delayed crosslinking composition, the reaction product thereof, the subterranean treatment composition including either of the same, or a mixture including any one of the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The delayed crosslinking composition, the reaction product thereof, the subterranean treatment composition including either of the same, or a mixture including any one of the same can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the delayed crosslinking composition, the reaction product thereof, the subterranean treatment composition including either of the same, or a mixture including the subterranean treatment composition. For example, the delayed crosslinking composition, the reaction product thereof, the subterranean treatment composition including either of the same, or a mixture including the subterranean treatment composition, can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the delayed crosslinking composition, the reaction product thereof, the subterranean treatment composition including either of the same, or a mixture including any one of the same can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The delayed crosslinking composition, the reaction product thereof, the subterranean treatment composition including either of the same, or a mixture including the subterranean treatment composition, can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the delayed crosslinking composition or the reaction product thereof disclosed herein can directly or indirectly affect one or more components or pieces of equipment associated with the preparation, delivery, recapture, recycling, reuse, and/or disposal of the disclosed composition including the delayed crosslinking composition or the reaction product thereof. For example, and with reference to FIG. 1, the disclosed composition including the delayed crosslinking composition or the reaction product thereof can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The delayed crosslinking composition, the reaction product thereof, or composition including either of the same can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the delayed crosslinking composition, the reaction product thereof, or composition including either of the same can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the delayed crosslinking composition, the reaction product thereof, or composition including either of the same can be stored, reconditioned, and/or regulated until added to the drilling fluid 122.

As mentioned above, the delayed crosslinking composition, the reaction product thereof, or composition including either of the same can directly or indirectly affect the components and equipment of the drilling assembly 100. For example, the delayed crosslinking composition, the reaction product thereof, or composition including either of the same can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition.

The delayed crosslinking composition, the reaction product thereof, or composition including either of the same can directly or indirectly affect the pump 120, which representatively includes any conduits, pipelines, trucks, tubulars, and/or pipes used to fluidically convey the delayed crosslinking composition, the reaction product thereof, or composition including either of the same to the subterranean formation; any pumps, compressors, or motors (e.g., topside or downhole) used; any valves or related joints used to regulate the pressure or flow rate; and any sensors (e.g., pressure, temperature, flow rate, and the like), gauges, and/or combinations thereof, and the like. The delayed crosslinking composition, the reaction product thereof, or composition including either of the same can also directly or indirectly affect the mixing hopper 134 and the retention pit 132 and their assorted variations.

The delayed crosslinking composition, the reaction product thereof, or composition including either of the same can also directly or indirectly affect the various downhole or subterranean equipment and tools that can come into contact with the delayed crosslinking composition, the reaction product thereof, or composition including either of the same such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The delayed crosslinking composition, the reaction product thereof, or composition including either of the same can also directly or indirectly affect any downhole heat exchangers, valves and corresponding actuation devices, tool seals, packers and other wellbore isolation devices or components, and the like associated with the wellbore 116. The delayed crosslinking composition, the reaction product thereof, or composition including either of the same can also directly or indirectly affect the drill bit 114, which can include roller cone bits, polycrystalline diamond compact (PDC) bits, natural diamond bits, hole openers, reamers, coring bits, and the like.

While not specifically illustrated herein, the delayed crosslinking composition, the reaction product thereof, or composition including either of the same can also directly or indirectly affect any transport or delivery equipment used to convey the delayed crosslinking composition, the reaction product thereof, or composition including either of the same to the drilling assembly 100 such as, for example, any transport vessels, conduits, pipelines, trucks, tubulars, and/or pipes used to fluidically move the delayed crosslinking composition, the reaction product thereof, or composition including either of the same from one location to another, any pumps, compressors, or motors used, any valves or related joints used to regulate the pressure or flow rate, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the subterranean treatment composition described herein in a subterranean formation, or that can perform or be generated by performance of a method for using the subterranean treatment composition described herein. The system can include a subterranean treatment composition including at least one of a delayed crosslinking composition and a reaction product thereof, such as any delayed crosslinking composition or reaction product thereof described herein. The system can also include a subterranean formation including the subterranean treatment composition therein. In some embodiments, the subterranean treatment composition in the system can also include a downhole fluid, or the system can include a mixture of the subterranean treatment composition and downhole fluid. In some embodiments, the system can include a tubular, and a pump configured to pump the subterranean treatment composition into the subterranean formation through the tubular.

In some embodiments, the present invention provides a system including a tubular disposed in a subterranean formation. The system also can include a pump configured to pump a subterranean treatment composition through the tubular. The subterranean treatment composition can include at least one of a delayed crosslinking composition and a reaction product thereof, such as any delayed crosslinking composition or reaction product thereof described herein. The delayed crosslinking composition can include a crosslinker including a functionality chosen from —B(OH)$_2$, —B$^-$(OH)$_2$, a salt thereof, an ester thereof, and a combination thereof. The delayed crosslinking composition also includes a glycol including at least one of a 1,2-diol and a 1,3-diol.

Various embodiments provide systems and apparatus configured for delivering the delayed crosslinking composition, the reaction product thereof, or composition including either of the same to a subterranean location and for using the same therein, such as for a drilling operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing the delayed crosslinking composition, the reaction product thereof, or composition including either of the same described herein.

In some embodiments, the system can include a drill string disposed in a wellbore, with the drill string including a drill bit at a downhole end of the drill string. The system can also include an annulus between the drill string and the wellbore. The system can also include a pump configured to circulate the subterranean treatment composition through the drill string, through the drill bit, and back above-surface through the annulus. In some embodiments, the system can include a fluid processing unit configured to process the subterranean composition exiting the annulus to generate a cleaned drilling fluid for recirculation through the wellbore.

In various embodiments, the present invention provides an apparatus. The apparatus can be any suitable apparatus that can use or that can be generated by use of the delayed crosslinking composition, the reaction product thereof, or composition including either of the same described herein in a subterranean formation, or that can perform or be generated by performance of a method for using the delayed crosslinking composition, the reaction product thereof, or composition including either of the same described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the subterranean treatment composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey material to the high pressure pump. In such embodiments, the low pressure pump can "step up" the pressure of the material before it reaches the high pressure pump.

In some embodiments, the systems or apparatuses described herein can further include a mixing tank that is upstream of the pump and in which the delayed crosslinking composition, the reaction product thereof, the subterranean treatment composition including either of the same, or a mixture including the subterranean treatment composition is formulated. In various embodiments, the pump (e.g., a low pressure pump, a high pressure pump, or a combination thereof) can convey material from the mixing tank or other source of the composition to the tubular. In other embodiments, however, the delayed crosslinking composition, the reaction product thereof, the subterranean treatment composition including either of the same, or a mixture including the subterranean treatment composition can be formulated offsite and transported to a worksite, in which case material can be introduced to the tubular via the pump directly from its shipping container (e.g., a truck, a railcar, a barge, or the like) or from a transport pipeline. In either case, material can be drawn into the pump, elevated to an appropriate pressure, and then introduced into the tubular for delivery to the subterranean formation.

Figure 2:
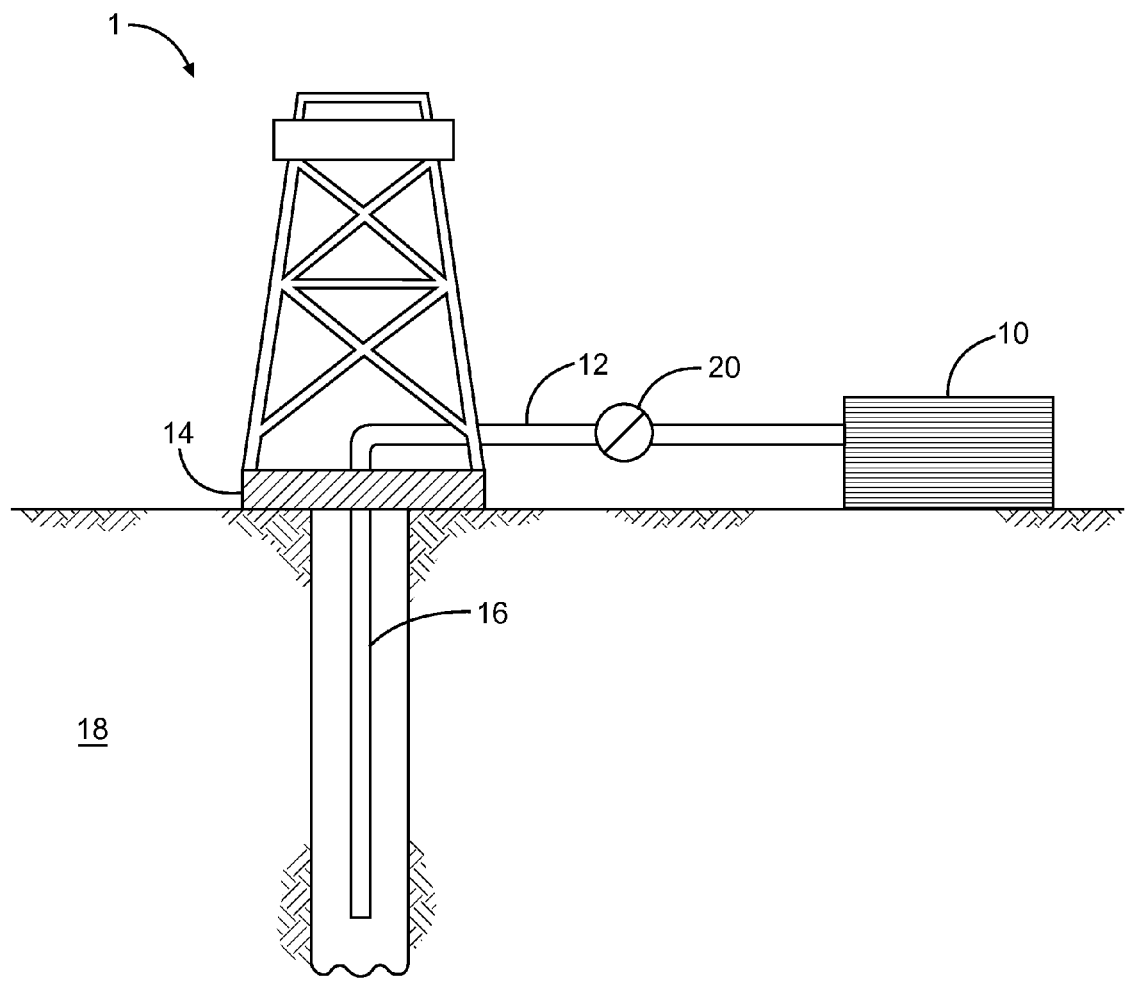
FIG. 2 illustrates a system or apparatus for delivering a composition to a subterranean formation, in accordance with various embodiments.

FIG. 2 shows an illustrative schematic of systems and apparatuses that can deliver embodiments of the delayed crosslinking composition, the reaction product thereof, the subterranean treatment composition including either of the same, or a mixture including the subterranean treatment composition of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the delayed crosslinking composition, the reaction product thereof, the subterranean treatment composition including either of the same, or a mixture including the subterranean treatment composition, can be formulated. The material can be conveyed via line 12 to wellhead 14, where the material enters tubular 16, with tubular 16 extending from wellhead 14 into subterranean formation 18. Upon being ejected from tubular 16, the material can subsequently penetrate into subterranean formation 18. Pump 20 can be configured to raise the pressure of the material to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the subterranean treatment composition can, in some embodiments, flow back to wellhead 14 and exit subterranean formation 18. The material that flows back can be substantially diminished in the concentration of the delayed crosslinking composition or reaction product of the delayed crosslinking composition therein. In some embodiments, the material that has flowed back to wellhead 14 can subsequently be recovered, and in some examples reformulated, and recirculated to subterranean formation 18.

It is also to be recognized that the disclosed delayed crosslinking composition, the reaction product thereof, the subterranean treatment composition including either of the same, or a mixture including the subterranean treatment composition, can also directly or indirectly affect the various downhole or subterranean equipment and tools that can come into contact therewith during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Subterranean Treatment Composition.

Various embodiments provide a subterranean treatment composition. The composition can be any suitable composition that can be used to perform an embodiment of the method for treatment of a subterranean formation described herein.

For example, the subterranean treatment composition can include at least one of a delayed crosslinking composition and a reaction product thereof, such as any delayed crosslinking composition or reaction product thereof described herein. The delayed crosslinking composition can include a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition can also include a glycol including at least one of a 1,2-diol and a 1,3-diol.

In some embodiments, the subterranean treatment composition further includes a downhole fluid. The downhole fluid can be any suitable downhole fluid. In some embodiments, the downhole fluid is a composition for fracturing of a subterranean formation or subterranean material, or a fracturing fluid.

In various embodiments, the subterranean treatment composition can be an aqueous subterranean treatment composition for treatment of a subterranean formation. The subterranean treatment composition can include about 0.01 wt % to about 50 wt % of a viscosifier crosslinkable via at least one of boric acid, tetrahydroxyborate, a salt thereof, and an ester thereof. The subterranean treatment composition can also include at least one of a delayed crosslinking composition and a reaction product thereof, such as any delayed crosslinking composition or reaction product hereof described herein. The delayed crosslinking composition or product thereof can be about 0.01 wt % to about 50 wt % of the subterranean treatment composition. The delayed crosslinking composition can include about 0.01 wt % to about 50 wt % of a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition can also include about 0.01 wt % to about 50 wt % of glycerin.

Method for Preparing a Subterranean Treatment Composition.

In various embodiments, the present invention provides a method for preparing a composition for treatment of a subterranean formation. The method can be any suitable method that produces a composition described herein. For example, the method can include forming a composition including at least one of a delayed crosslinking composition and a reaction product thereof, such as any delayed crosslinking composition or reaction product thereof described herein. The delayed crosslinking composition can include a crosslinker including a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof. The delayed crosslinking composition can include a glycol including at least one of a 1,2-diol and a 1,3-diol.

The method of forming the subterranean treatment composition for treatment of a subterranean formation can include combining the crosslinker including the boron functionality and the glycol. The method of forming the subterranean treatment composition can include allowing the crosslinker and the glycol to form a reaction product thereof. The method of forming the subterranean treatment composition can include combining the boron-crosslinkable viscosifier with the delayed crosslinking composition or with the reaction product thereof.

EXAMPLES

Various embodiments of the present invention can be better understood by reference to the following Examples which are offered by way of illustration. The present invention is not limited to the Examples given herein.

Example 1. Comparative

A delayed stimulation fluid system was prepared that included 30 ppt (pounds per thousand gallons) guar, 1 gpt (gallon per thousand gallons) of a thick aqueous suspension of ulexite (hydrated sodium calcium borate hydroxide, a boron-based crosslinker). The stimulation fluid was preheated to 167° F. (75° C.). Crosslinking occurred abovesurface, such that high friction pressure was experienced while pumping the stimulation fluid downhole.

Example 2. Preparation of Delayed Stimulation Fluid

For making the stimulation fluid water was preheated to 167° F. (75° C.) with 3% KCl for clay stabilization. 30 ppt guar was added and was allowed to hydrate for 30 minutes. The pH of the base gel was 7.2 and the viscosity was 21 cp @ 167° F. (75° C.) @ 300 rpm. For measurement of viscosity a Fann® Model 35. After complete hydration, 4 gpt of potassium bicarbonate solution was used to increase the pH of base gel up to 10.6. For testing of crosslinking time, four stimulation fluids were made as shown in Table 1, using the boron-based crosslinker of Example 1. Sample 2.1 corresponds to the comparative stimulation fluid of Example 1.

TABLE 1

Stimulation fluids 2.1-2.4 with variable glycerol concentration

| | Sample | | | | |
| --- | --- | --- | --- | --- | --- |
| | 2.1 | 2.2 | 2.3 | 2.4 | Units |
| Base gel | 500 | 500 | 500 | 500 | mL |
| Glycerol | 0 | 2 | 3 | 5 | gpt |
| Boron-based crosslinker | 1 | 1 | 1 | 1 | gpt |

To measure the crosslinking time, vortex close time was measured. The vortex close time was defined as the time when the fluid increased in viscosity such that the vortex formed by the Fann® Model 35 closed such that the hub nut of the viscometer was covered by the fluid. To measure the vortex close time, 500 mL of preheated 167° F. (75° C.) base gel was taken in a Waring blender Jar and the blender speed was adjusted until the fluid vortex exposed the hub nut and air was not being entrained. The glycerol and the boron-based crosslinker were added to the fluid vortex in the amounts shown in Table 1, and the vortex close time was recorded as shown in Table 2.

TABLE 2

Vortex closure time for Samples 2.1-2.4.

| | Sample | | | | |
| --- | --- | --- | --- | --- | --- |
| | 2.1 | 2.2 | 2.3 | 2.4 | Units |
| Vortex close time | 10 | 90 | 180 | 300 | seconds |

The delay in crosslinking time was directly proportional to the vortex close time measured in blender cup.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in a subterranean formation a subterranean treatment composition comprising at least one of a delayed crosslinking composition and a reaction product thereof, the delayed crosslinking composition comprising a crosslinker comprising a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof; and a glycol comprising at least one of a 1,2-diol and a 1,3-diol.

Embodiment 2 provides the method of Embodiment 1, wherein the method further comprises obtaining or providing at least one of the subterranean treatment composition, the delayed crosslinking composition, and the reaction product of the delayed crosslinking composition, wherein the obtaining or providing occurs above-surface.

Embodiment 3 provides the method of any one of Embodiments 1-2, wherein the method further comprises obtaining or providing at least one of the subterranean treatment composition, the delayed crosslinking composition, and the reaction product of the delayed crosslinking composition, wherein the obtaining or providing occurs in the subterranean formation.

Embodiment 4 provides the method of any one of Embodiments 1-3, further comprising allowing the crosslinker and the glycol to react to provide the reaction product of the delayed crosslinking composition.

Embodiment 5 provides the method of Embodiment 4, wherein the reacting of the crosslinker and the glycol occurs above-surface.

Embodiment 6 provides the method of any one of Embodiments 4-5, wherein the reacting of the crosslinker and the glycol occurs in the subterranean formation.

Embodiment 7 provides the method of any one of Embodiments 1-6, further comprising fracturing the subterranean formation.

Embodiment 8 provides the method of any one of Embodiments 1-7, wherein the subterranean treatment composition is preheated prior to placing the subterranean treatment composition in the subterranean formation.

Embodiment 9 provides the method of any one of Embodiments 8, wherein the subterranean treatment composition is preheated to about 50° C. to 100° C. prior to placing the subterranean treatment composition in the subterranean formation.

Embodiment 10 provides the method of any one of Embodiments 1-9, further comprising preheating the subterranean treatment composition prior to placing the subterranean treatment composition in the subterranean formation.

Embodiment 11 provides the method of any one of Embodiments 1-10, wherein the subterranean treatment composition further comprises a carrier fluid.

Embodiment 12 provides the method of Embodiment 11, wherein the carrier fluid comprises water.

Embodiment 13 provides the method of any one of Embodiments 11-12, wherein about 0.01 wt % to about 99.99 wt % of the subterranean treatment composition is the carrier fluid.

Embodiment 14 provides the method of any one of Embodiments 1-13, wherein the subterranean treatment composition further comprises a viscosifier crosslinkable via at least one of boric acid, tetrahydroxyborate, a salt thereof, and an ester thereof.

Embodiment 15 provides the method of Embodiment 14, wherein about 0.01 wt % to about 99.99 wt % of the subterranean treatment composition is the viscosifier.

Embodiment 16 provides the method of any one of Embodiments 14-15, wherein about 0.01 wt % to about 50 wt % of the subterranean treatment composition is the viscosifier.

Embodiment 17 provides the method of any one of Embodiments 14-16, wherein the viscosifier is at least one of poly(vinyl alcohol), a substituted or unsubstituted poly(C$_1$-C$_{20}$)alkenoic acid, a polysaccharide, a substituted or unsubstituted (C$_1$-C$_{20}$)hydrocarbyl ester thereof, a salt thereof, and a copolymer thereof.

Embodiment 18 provides the method of any one of Embodiments 14-17, wherein the viscosifier is at least one of poly(vinyl alcohol), a substituted or unsubstituted poly(C$_1$-C$_{20}$)alkenoic acid, polyhydroxypropyl acrylic acid, acrylamide, polyfumaric acid, polymethacrylic acid, polyhydroxypropyl acrylic acid, poly(vinyl phosphonic acid), poly(vinylidene diphosphonic acid), polyitaconic acid, polycrotonic acid, poly(mesoconic acid), poly(polycitraconic acid), poly(styrene sulfonic acid), poly(allyl sulfonic acid), poly(methallyl sulfonic acid), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum, gum ghatti, gum arabic, locust bean gum, cellulose, and derivatized cellulose.

Embodiment 19 provides the method of any one of Embodiments 14-18, wherein the viscosifier is at least one of guar and hydroxypropyl guar.

Embodiment 20 provides the method of any one of Embodiments 14-19, wherein the method comprises crosslinking the viscosifier with at least one of the delayed crosslinking composition and the reaction product thereof.

Embodiment 21 provides the method of any one of Embodiments 1-20, wherein about 0.01 wt % to about 100 wt % of the subterranean treatment composition is at least one of the delayed crosslinking composition and the reaction product thereof.

Embodiment 22 provides the method of any one of Embodiments 1-21, wherein about 0.01 wt % to about 50 wt % of the subterranean treatment composition is at least one of the delayed crosslinking composition and the reaction product thereof.

Embodiment 23 provides the method of any one of Embodiments 1-22, wherein about 0.01 wt % to about 99.99 wt % of the delayed crosslinking composition is the crosslinker.

Embodiment 24 provides the method of any one of Embodiments 1-23, wherein about 0.01 wt % to about 50 wt % of the delayed crosslinking composition is the crosslinker.

Embodiment 25 provides the method of any one of Embodiments 1-24, wherein the crosslinker has at least one of the structures R—B(OH)$_2$, R—B$^-$(OH)$_2$, a substituted or unsubstituted (C$_1$-C$_{20}$)hydrocarbyl ester thereof, and a salt thereof, wherein R is chosen from a substituted or unsubstituted (C$_1$-C$_{50}$)hydrocarbyl, a polymer having a repeating unit comprising a substituted or unsubstituted (C$_1$-C$_{50}$) hydrocarbyl, —O—B(OR$^1$)$_2$, and —O—B$^-$(OR$^1$)$_3$, wherein at each occurrence R$^1$ is independently selected from —H, —B(OR$^1$)$_2$, and —B$^-$(OR$^1$)$_3$, wherein each B or B$^-$ in R$^1$ and the corresponding groups attached thereto are each independently the same or different as those occurring in R.

Embodiment 26 provides the method of any one of Embodiments 1-25, wherein the crosslinker has at least one of the structures $B(OR^2)_3$, $-B^-(OR^2)_4$, a substituted or unsubstituted $(C_1-C_{20})$hydrocarbyl ester thereof, and a salt thereof, wherein at each occurrence $R^2$ is independently selected from —H, —$B(OR^3)_2$, and —B—$(OR^3)_4$, wherein each B or $B^-$ in $R^2$ and the corresponding groups attached thereto are each independently the same or different as those in the occurring in the $B(OR^2)_3$ and the $B^-(OR^2)_4$.

Embodiment 27 provides the method of any one of Embodiments 1-26, wherein the crosslinker has one of the following structures, or a salt or a substituted or unsubstituted $(C_1-C_{20})$hydrocarbyl ester thereof:

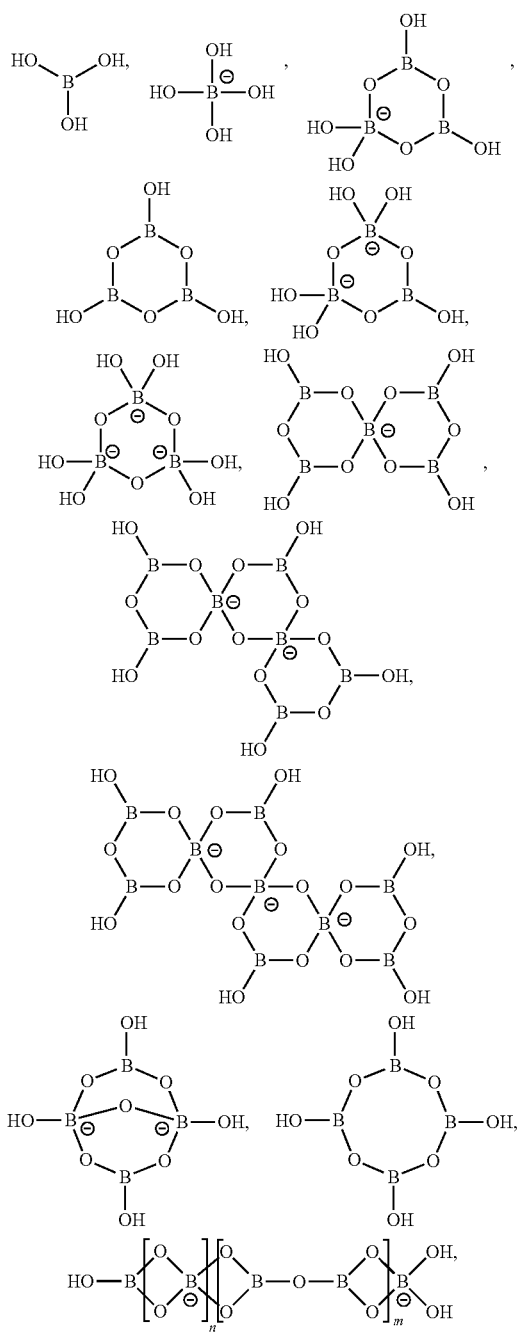

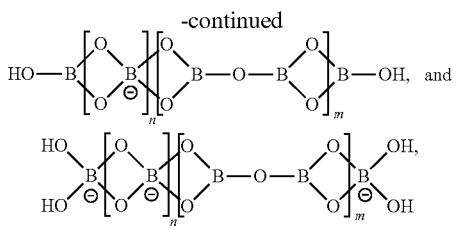

wherein n and m are each independently about 0 to about 1,000, wherein n+m is at least 1, wherein the repeating groups are in block or random copolymer arrangement.

Embodiment 28 provides the method of any one of Embodiments 1-27, wherein about 0.01 wt % to about 99.99 wt % of the delayed crosslinking composition is the glycol.

Embodiment 29 provides the method of any one of Embodiments 1-28, wherein about 0.01 wt % to about 50 wt % of the delayed crosslinking composition is the glycol.

Embodiment 30 provides the method of any one of Embodiments 1-29, wherein the 1,2-diol or 1,3-diol is a substituted or unsubstituted $(C_1-C_{50})$hydrocarbon glycol or a polymer comprising a repeating unit that is a substituted or unsubstituted $(C_1-C_{50})$hydrocarbon glycol.

Embodiment 31 provides the method of any one of Embodiments 1-30, wherein the 1,2-diol or 1,3-diol is a substituted or unsubstituted $(C_1-C_{20})$hydrocarbon glycol.

Embodiment 32 provides the method of any one of Embodiments 1-31, wherein the 1,2-diol or 1,3-diol is a $(C_1-C_{10})$alkane glycol.

Embodiment 33 provides the method of any one of Embodiments 1-32, wherein the glycol is 1,2-propylene glycol, 1,3-propylene glycol, 1,2,3-propane triol, 2-methyl-2,4-pentane, 1,2-butanediol, 1,3-butanediol, or 2,3-butanediol.

Embodiment 34 provides the method of any one of Embodiments 1-33, wherein the glycol is a 1,2-diol.

Embodiment 35 provides the method of any one of Embodiments 1-34, wherein the glycol is glycerin.

Embodiment 36 provides the method of any one of Embodiments 1-35, wherein the glycol is an ester of glycerin and a substituted or unsubstituted $(C_1-C_{30})$hydrocarbon carboxylic acid at 1 hydroxy group of the glycerin.

Embodiment 37 provides the method of any one of Embodiments 1-36, further comprising combining at least one of the subterranean treatment composition, the delayed crosslinking composition, and the reaction product of the delayed crosslinking composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation comprises placing the mixture in the subterranean formation.

Embodiment 38 provides the method of any one of Embodiments 1-37, wherein at least one of prior to, during, and after the placing of the subterranean treatment composition in the subterranean formation, the subterranean treatment composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

Embodiment 39 provides the method of any one of Embodiments 1-38, wherein at least one of the subterranean treatment composition, the delayed crosslinking composition, and the reaction product of the delayed crosslinking composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, cross-linking agent, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 40 provides the method of any one of Embodiments 1-39, wherein the subterranean treatment composition further comprises a proppant, a resin-coated proppant, or a combination thereof.

Embodiment 41 provides the method of any one of Embodiments 1-40, wherein the placing of the composition in the subterranean formation comprises pumping the composition through a tubular disposed in a wellbore and into the subterranean formation.

Embodiment 42 provides a system for performing the method of any one of Embodiments 1-41, the system comprising:
a tubular disposed in the subterranean formation; and
a pump configured to pump the composition in the subterranean formation through the tubular.

Embodiment 43 provides a method of treating a subterranean formation, the method comprising:
placing in a subterranean formation an aqueous subterranean treatment composition comprising
about 0.01 wt % to about 50 wt % of a viscosifier crosslinkable via at least one of boric acid, tetrahydroxyborate, a salt thereof, and an ester thereof; and
at least one of a delayed crosslinking composition and a reaction product thereof, wherein the delayed crosslinking composition or product thereof is about 0.01 wt % to about 50 wt % of the subterranean treatment composition, the delayed crosslinking composition comprising
about 0.01 wt % to about 50 wt % of a crosslinker comprising a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof; and
about 0.01 wt % to about 50 wt % of glycerin.

Embodiment 44 provides a system comprising:
a subterranean treatment composition comprising at least one of a delayed crosslinking composition and a reaction product thereof, the delayed crosslinking composition comprising
a crosslinker comprising a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof; and
a glycol comprising at least one of a 1,2-diol and a 1,3-diol; and
a subterranean formation comprising the composition therein.

Embodiment 45 provides the system of Embodiment 44, further comprising
a tubular disposed in the subterranean formation; and
a pump configured to pump the composition in the subterranean formation through the tubular.

Embodiment 46 provides a system comprising
a tubular disposed in a subterranean formation; and
a pump configured to pump a subterranean treatment composition comprising at least one of a delayed crosslinking composition and a reaction product thereof through the tubular, wherein the delayed crosslinking composition comprises
a crosslinker comprising a functionality chosen from —B(OH)$_2$, —B$^-$(OH)$_2$, a salt thereof, an ester thereof, and a combination thereof; and
a glycol comprising at least one of a 1,2-diol and a 1,3-diol.

Embodiment 47 provides a subterranean treatment composition for treatment of a subterranean formation, the composition comprising:
at least one of a delayed crosslinking composition and a reaction product thereof, the delayed crosslinking composition comprising
a crosslinker comprising a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof; and
a glycol comprising at least one of a 1,2-diol and a 1,3-diol.

Embodiment 48 provides the subterranean treatment composition of Embodiment 47, wherein the composition further comprises a downhole fluid.

Embodiment 49 provides the subterranean treatment composition of any one of Embodiments 47-48, wherein the composition is a composition for fracturing of a subterranean formation.

Embodiment 50 provides an aqueous subterranean treatment composition for treatment of a subterranean formation, the subterranean treatment composition comprising:
about 0.01 wt % to about 50 wt % of a viscosifier crosslinkable via at least one of boric acid, tetrahydroxyborate, a salt thereof, and an ester thereof; and
at least one of a delayed crosslinking composition and a reaction product thereof, wherein the delayed crosslinking composition or product thereof is about 0.01 wt % to about 50 wt % of the subterranean treatment composition, the delayed crosslinking composition comprising
about 0.01 wt % to about 50 wt % of a crosslinker comprising a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof; and
about 0.01 wt % to about 50 wt % of glycerin.

Embodiment 51 provides a method of preparing a subterranean treatment composition for treatment of a subterranean formation, the method comprising:

forming a subterranean treatment composition comprising at least one of a delayed crosslinking composition and a reaction product thereof, the delayed crosslinking composition comprising a crosslinker comprising a functionality chosen from —B(OH)$_2$, —B$^-$(OH)$_2$, —O—B(OH)—O—B(OH)—O—, —O—B(OH)—O—B$^-$(OH)(—O—)$_2$, a salt thereof, an ester thereof, and a combination thereof; and a glycol comprising at least one of a 1,2-diol and a 1,3-diol.

Embodiment 52 provides the composition, apparatus, method, or system of any one or any combination of Embodiments 1-51 optionally configured such that all elements or options recited are available to use or select from.

What is claimed is:

1. A method of treating a subterranean formation, comprising:

placing in the subterranean formation a subterranean treatment composition comprising at least one of a delayed crosslinking composition or a reaction product thereof, the delayed crosslinking composition comprising:

a crosslinker comprising a functionality selected from the group consisting of —O—B(OH)—O—B(OH)—O—, —O—B(OH)—O—B$^-$(OH)(—O—)$_2$, a salt thereof, an ester thereof, and a combination thereof; and a glycol comprising at least one of a 1,2-diol or a 1,3-diol.

2. The method of claim 1, further comprising allowing the crosslinker and the glycol to react to provide the reaction product of the delayed crosslinking composition.

3. The method of claim 1, further comprising fracturing the subterranean formation.

4. The method of claim 1, wherein the subterranean treatment composition is preheated to a temperature of about 40° C. to about 200° C. prior to placing the subterranean treatment composition in the subterranean formation.

5. The method of claim 1, wherein the subterranean treatment composition further comprises a carrier fluid and the subterranean treatment composition is preheated to a temperature of about 50° C. to about 100° C. prior to placing the subterranean treatment composition in the subterranean formation.

6. The method of claim 5, wherein the carrier fluid comprises water.

7. The method of claim 1, wherein the subterranean treatment composition further comprises a viscosifier crosslinkable via at least one of boric acid, tetrahydroxyborate, a salt thereof, or an ester thereof.

8. The method of claim 7, further comprising crosslinking the viscosifier with at least one of the delayed crosslinking composition or the reaction product thereof.

9. The method of claim 1, wherein about 0.01 wt % to about 50 wt % of the delayed crosslinking composition is the crosslinker.

10. The method of claim 1, wherein about 0.01 wt % to about 50 wt % of the delayed crosslinking composition is the glycol.

11. The method of claim 1, wherein the 1,2-diol or 1,3-diol is a substituted or unsubstituted ($C_1$-$C_{50}$)hydrocarbon glycol or a polymer comprising a repeating unit that is a substituted or unsubstituted ($C_1$-$C_{50}$)hydrocarbon glycol.

12. The method of claim 1, wherein the crosslinker comprises the functionality of —O—B(OH)—O—B(OH)—O—.

13. The method of claim 1, wherein the crosslinker comprises the functionality of —O—B(OH)—O—B$^-$(OH)(—O—)$_2$.

* * * * *